April 9, 1940.　　　　E. G. BEIDERMAN　　　　2,196,488
TIME CONTROLLED ELECTRIC SWITCH
Original Filed May 20, 1935　　　2 Sheets-Sheet 2

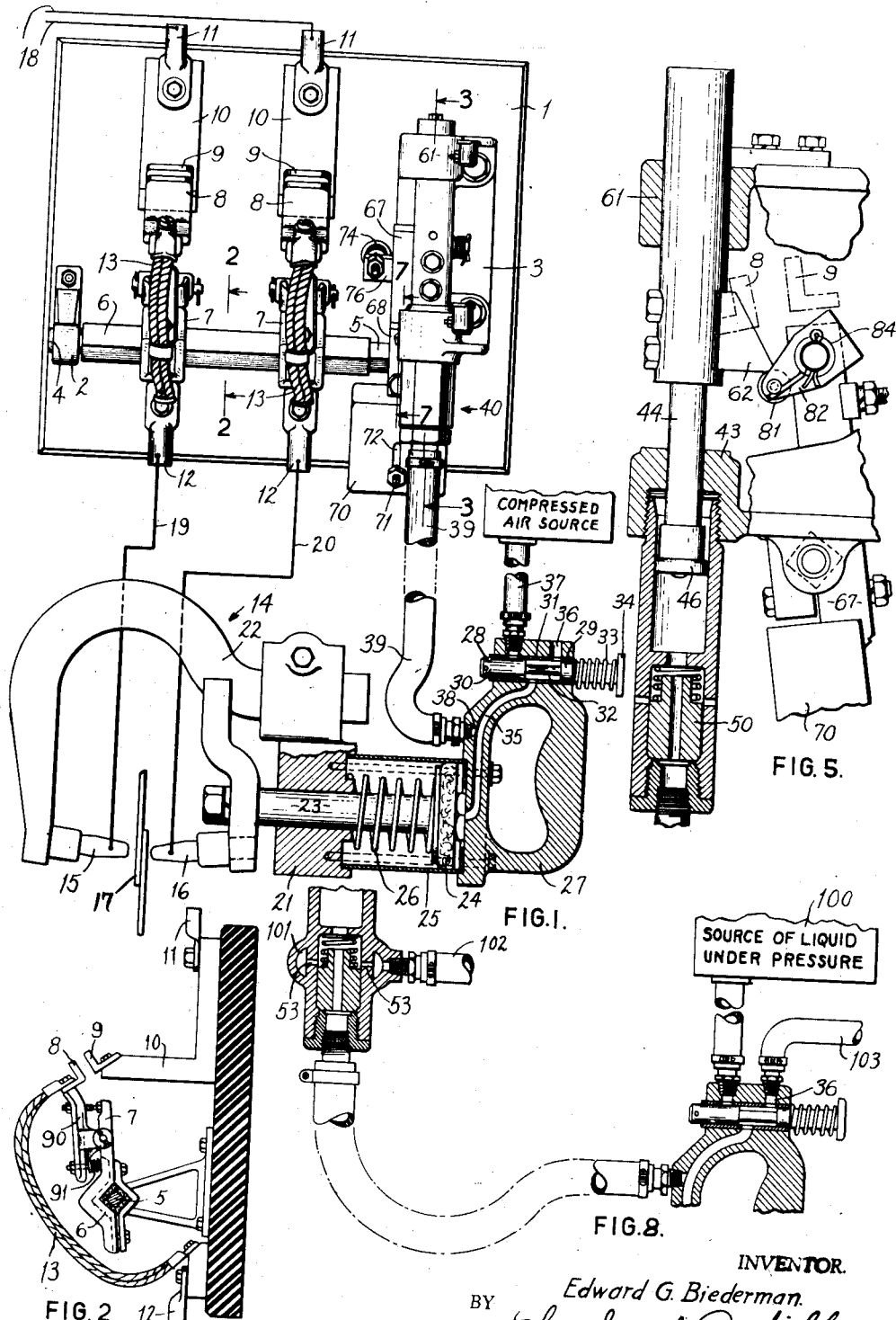
April 9, 1940.    E. G. BEIDERMAN    2,196,488
TIME CONTROLLED ELECTRIC SWITCH
Original Filed May 20, 1935    2 Sheets-Sheet 1
INVENTOR.
Edward G. Biederman.
BY Slough and Caufield
ATTORNEY.

INVENTOR.
Edward G. Biederman
BY
Slough and Caufield
ATTORNEY.

Patented Apr. 9, 1940

2,196,488

UNITED STATES PATENT OFFICE 2,196,488

TIME CONTROLLED ELECTRIC SWITCH

Edward G. Beiderman, Detroit, Mich., assignor to The Clark Controller Company, Cleveland, Ohio, a corporation of Ohio Original application May 20, 1935, Serial No. 22,407, now Patent No. 2,047,573, dated July 14, 1936. Divided and this application June 13, 1936, Serial No. 84,981

28 Claims. (Cl. 200—33)

This invention relates to electric switches for controlling the duration of electric currents in electric circuits, particularly circuits in which impulses of short duration are utilized for various purposes, such for example as electric spot-welding.

The invention is particularly advantageous for controlling the duration of electric welding current when it is applied to the work to be welded by a so-called spot-welding gun and the invention will therefore be described herein in association with a welding apparatus of that character, although the invention is applicable to other types of welding apparatus and applicable to other arts than welding which utilize electric currents of timed duration.

In one general class of welding apparatus, a gun having jaw type electrodes is presented to the work to be welded to dispose the work between the jaws; a valve or other means on the gun is then operated by the operator to admit fluid under pressure to the gun to move the jaws to grip the work; and an electric switch is closed at the proper instant and for a suitable length of time to send a welding current impulse over a suitable circuit through the jaws and the work to effect the weld; the jaws may thereafter be released by releasing the fluid pressure applied to the gun.

It is an object of the present invention to provide an improved electric switch for controlling the welding current supplied to a welding gun, the switch and gun being both operable by fluid under pressure controlled by the gun operator.

Another object is to provide an electric switch of the class referred to having improved means to cause the gun to be operated by the fluid pressure before operation of the switch.

Another object is to provide a switch of the class referred to having improved means to effect instantaneous restoring of the switch upon interruption of the fluid pressure.

Another object is to provide an electric contactor or switch having improved means to effect operation thereof for a predetermined time interval only.

Another object is to provide an improved switch mechanism for controlling an electric circuit to energize the same with current impulses of timed duration.

Another object is to provide an electric switch having improved mechanism associated therewith of the fluid pressure operable type for effecting operation of the switch and for causing the switch to remain operated for a short predetermined period of time and then to be restored.

Another object is to provide an improved fluid pressure operable mechanism for controlling the operation of an electric switch and having improved means to effect rapid restoring of the fluid pressure operable mechanism.

Another object is to provide, in an electric switch having means to operate it to energize an electric circuit with current impulses of short duration, improved means for adjustably timing the duration of the impulses.

Other objects will be apparent to those skilled in the art to which my invention appertains.

My invention is fully disclosed in the following description taken in connection with the accompanying drawings, in which:

Fig. 1 is a front elevational view of a pneumatically operable electric switch or contactor and magnetically operable welding gun associated therewith and embodying my invention;

Fig. 2 is a sectional view taken from the plane 2—2 of Fig. 1;

Fig. 5 is a view similar to a part of Fig. 3 illustrating parts thereof in another operated position;

Figure 3:
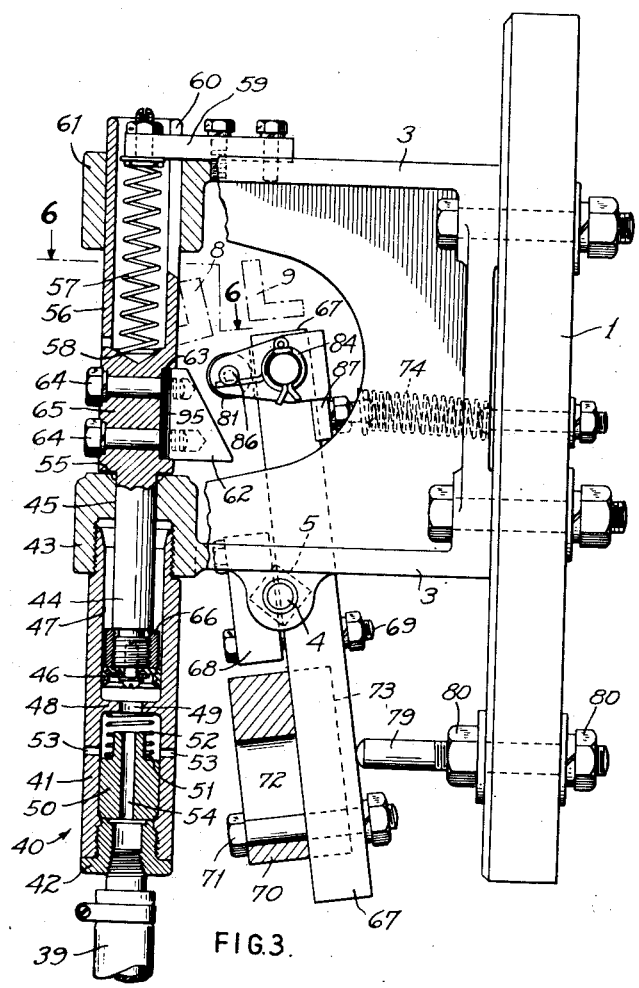
Fig. 3 is a view partly in section taken from the plane 3—3 of Fig. 1 and drawn to an enlarged scale and illustrating parts thereof in their normal or restored positions.
Figure 7:
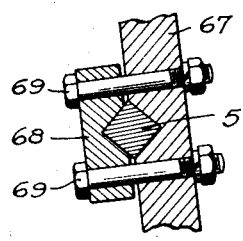
Figure 6:
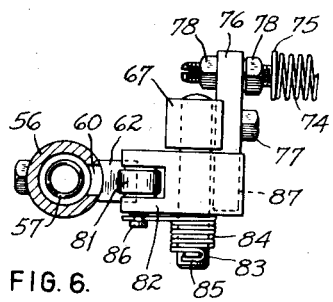

Fig. 6 a fragmentary view taken approximately from the plane 6—6 of Fig. 3;

Fig. 7 is a fragmentary view to an enlarged scale taken from the plane 7—7 of Fig. 1;

Fig. 8 is a fragmentary view similar to a part of Fig. 1 illustrating a modification.

Referring to the drawings, I have shown at 1 a base or panel preferably of insulating material, having spaced bearing brackets 2 and 3 upon which is oscillatably supported the rounded ends 4—4 of a shaft 5, a part of the length of which has telescoped thereon an insulating tube 6. Switch arms 7—7 are clamped on the shaft 5 and carry contacts 8—8 engageable with stationary contacts 9—9 mounted upon terminal blocks 10—10 on the panel 1 to which are connected terminals 11—11. Terminals 12—12 secured to the panel are connected by flexible leads 13—13 to the contacts 8—8.

The parts just described constitute an electric switch or contactor of well known form whereby upon rotation of the shaft 5 clockwise as viewed in Fig. 2, contacts 8 and 9 will be engaged and vice versa will be disengaged to control current in conductors connected to the terminals 11 and 12. The details of construction of the contactor constitute no essential part of my invention. Any suitable construction may be employed, the preferred construction having the elements thus far described.

At 14 is illustrated generally a welding gun having stationary and movable electrodes 15 and 16, the movable electrodes 16 being adapted to be moved, in a manner to be described, to compress, between the electrodes, work illustrated at 17 to be welded. The electrodes 15 and 16 are supplied with welding current by the diagrammatically illustrated circuit including supply mains 18—18 connected to the switch terminals 11—11 and wires 19 and 20 connected respectively to the electrodes 15 and 16 and to the terminal 12. As will be understood, when the switch shaft 5 is oscillated to engage contacts 8 and 9, current will flow from one supply main 18 to one electrode, through the work 17 and by way of the other electrode back to the other side of the line, to effect a weld at the work 17, and this current may be supplied from any suitable source such as the low voltage secondary of an alternating current transformer.

The construction of the gun 14 by which the electrode 16 may be pressure-moved, is not essential to the instant invention. Any of the well known pneumatically operated welding guns of this general type may be utilized. In the form illustrated, the gun comprises a body 21 in which is clamped a shank 22 supporting the electrode 15 and in which is reciprocable a piston rod 23 carrying at its outer end the electrode 16 and at its inner end connected to a piston 24 reciprocable in a cylinder 25. A spring 26 normally holds the piston 24 toward the right or electrode-disengaged position; and compressed air may be admitted to the other side of the piston 24 to propel it in the cylinder to engage the electrodes against tension of the spring 26.

A handle 27 for the gun operator has reciprocable in a bore therein, a valve 28 of the piston valve having piston portions 29 and 30 substantially sealing the bore 31 and an interconnecting neck 32. The valve 28 is normally disposed in an off position by a spring 33 abutting upon the handle at one end and upon an operator's valve button 34 at the other end; and in this position effects communication, by way of a duct 35 in the handle, from the cylinder 25 through the bore 31 around the neck 32 to atmosphere by way of an outlet duct 36.

When the operator presses the button 34, the valve 28 is moved over toward the left as viewed in the drawing, and first closes off the outlet 36 and then effects communication of the duct 35 with a conduit 37 connected to a source of air under pressure; thereupon, the compressed air flows by way of the duct 35 to the cylinder 25 and operates the piston for the purpose described.

Any suitable means may be provided as the source of compressed air referred to, and the conduit 37 is preferably a flexible hose and may be of well known construction.

A branch duct 38 communicates with the duct 35 and with another preferably flexible hose type conduit 39. The conduits 39 and 37 may be connected to the handle 27 by suitable threaded nipples thereon screwed into threaded bores in the handle as illustrated. The conduit 39 communicates with a cylinder and piston type pneumatic device 40 to be described mounted on the panel 1, and the conduit 39 as well as the conduit 37 is of suitable length so that the panel 1 may be stationarily mounted on a wall, column or the like and the gun freely movable by the operator from point to point along his work. Furthermore, the conduit 39 may be intentionally provided of preselected inside diameter or may be of intentionally increased length for a purpose to be described.

Referring now to the pneumatic device 40, at 41 is a pneumatic cylinder the lower end of which is closed by a plug 42 threaded to receive a nipple on the end of the conduit 39, and the upper end of which is threaded into a boss 43 on the bearing bracket 3 above referred to which is secured to the panel 1.

A piston rod 44 is reciprocable in a bore 45 in the boss 43 and carries on its lower end a piston 46 fitting the bore 47 of the cylinder. The lower portion of the cylinder is separated from the upper portion by a partition 48 having a perforation 49 therein, and, in the lower part of the cylinder, a piston-like valve 50 is reciprocatively fitted, normally resting at its lower end upon the upper end of the plug 42 and at its upper end portion provided with a shoulder 51 upon which one end of a spring 52 abuts, the other end of the spring abutting upon the partition 48.

Exhaust ports 53—53 are provided extending through the cylinder wall and communicating with the interior of the cylinder at a point just above the shoulder 51; and the valve 50 has a duct 54 extending longitudinally therethrough. The operation of these parts will presently be described.

The upper end of the piston rod 44 is enlarged into a head 65 above the boss 43, providing a shoulder 55 resting upon the upper side of the boss 43 and supporting the piston rod and piston and the parts of the piston rod above the shoulder. These parts comprise an upwardly open tubular spring housing 56, housing a spring 57 the lower end of which abuts upon a shoulder 58 in the housing and the upper end of which abuts upon a finger 59 extending into the tubular housing through a slot 60 and connected to the bracket 3. The bracket 3 has also an upper boss 61 in a bore of which the tubular extension 56 is reciprocatively supported. The head 65 has secured thereto a cam 62 of the inclined plane type seated in a recess 63 in the head, and secured in the recess by bolts 64—64 projected through the head and threaded into the cam, and a plurality of shims 95—95 is provided at the bottom of the recess to adjustably position the cam laterally of the head.

The operation of the pneumatic device thus far described is as follows. When compressed air is supplied through the conduit 39, pressure thereof will at once lift the valve 50, causing it to cut off exhaust through the ports 53—53 and compressing the spring 52; the compressed air, then holding the valve 50 in its upper position, will flow through the duct 54 and perforation 49 to the lower side of the piston 46 and will lift the piston and its piston rod 44 and the head 65 against pressure of the spring 57, giving a quick upward thrust to the cam 62, and holding the piston and head 65 in the upper position, which position may be determined by a shoulder 66 on the piston rod 44 in the cylinder 41. The upward thrust is cushioned by the inherent yieldable characteristic of the compressed air being used.

When the pressure in the conduit 39 is released, the spring 52 will instantaneously restore the valve 50, downwardly, opening the ports 53—53 thereby releasing pressure under the piston 46 whereupon the spring 57 will instantaneously push the head 65 and piston rod 44 and piston 46 downwardly, engaging the shoulder 55 with the upper side of the boss 43, thus restoring the parts to their normal positions.

The above described operation is that which occurs when the valve 34 is operated rapidly, as in ordinary practice. If, however, the valve 28 be retained in its operated position for a substantial though short interval of time, the pressure in the cylinder 41 which is communicated to the upper side of the valve 50 will obviously become equal to the pressure on the underside of the valve 50, and the valve will be returned downwardly to its normal position by the spring 52, thereafter the piston 46 being held in its operated or upper position by reduced air pressure, since some of the applied pressure is released outwardly through the ports 53—53 so that the return spring 57 substantially balances the upward thrust of the air pressure on the piston, with the air pressure of course predominating to insure reliable operation. If, now, the valve 28 be released, the piston 46 will immediately descend to its normal position exhausting the slight remaining pressure outwardly through the ports 53—53. The quick return of the piston thus effected by the release of pressure thereunder by the next successive operation may be made in a very short interval of time thereafter.

An arm 67 is rigidly secured to the shaft 5 in any suitable manner, for example by a clamp element 68 and bolts 69—69 as shown in Fig. 7. A weight element 70 is rigidly secured to the arm 67 below the shaft and is preferably adjustably movable thereon to vary its distance from the shaft axis, which adjustment may be provided by a bolt 71 extending through a slot 72 in the weight and through a perforation in the arm 67 and the weight may have wings 73 engaging the sides of the arm 67 to position it, the weight being clamped to the arm by the head and nut of the bolt 71. It will be observed that the center of gravity of the weight 70 is approximately directly under the axis of the shaft 5, the axis of the shaft being at the center of the round end 4 of the shaft as shown in Fig. 3. It will also now be apparent that the arm 67 will oscillate in unison with the shaft 5.

A spring 74 abuts at one end upon the panel 1 and at its other end upon the head of a stud 75 threaded into a lug 76 on the arm 67, which lug is preferably a separate piece secured to the arm 67 by a screw 77 as shown in Fig. 6. The spring 74 thus constrains, the arm 67 and therefore the shaft 5 and its switch arms 7—7 to a counter-clockwise position as viewed in Fig. 3. The tension of the spring 74 may be adjusted by turning the stud 75 and locking it by nuts 78—78. The position of the arm 67 is determined by an adjustable stop 79 projected through a hole in the panel 1, and adjustably positioned longitudinally and fixed on the panel by nuts 80—80 and the end of the post 79 abutting the arm 67 below the shaft.

Above the shaft 5, the arm 67 has mounted thereon a cam follower in the form of a roller 81, rotatably supported in a forked pawl 82 which in turn is pivoted on a pin 83 mounted on the arm 67. A coil spring 84 wound around the pin 83 and secured at one end thereto as at 85, has the other end engaging the underside of a pin 86 on the pawl 82 constraining the pawl to rotate clockwise as viewed in Fig. 3; and the pawl is stopped against clockwise rotation by engaging a portion 87 of the lug 76 but is free to rotate counter-clockwise.

Figure 4:
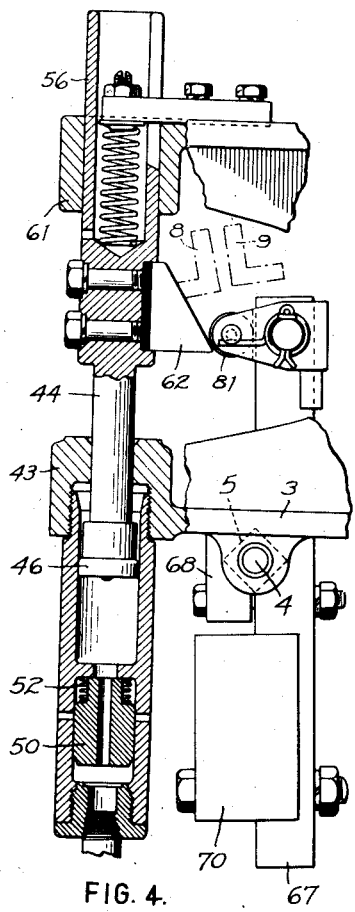
Fig. 4 is a view similar to a part of Fig. 3 illustrating parts thereof in an operated position.

The operation of the above-described apparatus will now be described. The normal position of the parts is that shown in Figs. 1, 2, and 3. The operator, preparing to make a weld, places the electrodes 15 and 16 relative to the work 17 as shown in Fig. 1 and then presses the valve button 34. Compressed air flows from the source through the conduit 37 through the duct 35 and, operating the piston 24, compresses the work between the electrodes with the desired welding pressure. Compressed air at the same time also flows from the conduit 37 through the ducts 35 and 38 to the conduit 39, and as above described in connection with Fig. 3, raises the valve 50 to close the escape ports 53 as shown in Fig. 4, and shoots the piston and piston rod 44 upwardly against the pressure of the spring 57, giving a quick upward thrust to the cam 62. The cam 62 engages the roller cam follower 81 and rides thereover giving a clockwise impulse to the arm 67 against the pressure of the spring 74.

Before this impulse is given to the arm 67, the contacts 8 and 9 are in their full open position as shown in broken lines in Fig. 3. As the arm 67 moves, the contacts approach each other as shown in Fig. 4. The upward impulse on the cam 62 carries it above and beyond the roller 81.

In the preferred mode of operation, the cam 62 leaves the roller 81 on its up stroke before the contacts 8 and 9 engage each other, and the arm 67 continues to move clockwise as viewed in Fig. 3 due to its inertia which of course is largely determined by the weight 70; thus after the cam leaves the roller, the arm 67 continues to move, carries the contact 8 into engagement with the contact 9. The inertia is finally absorbed by the spring 74 in its effort to return the arm 67 and by the pressure reaction of the contacts 8 and 9, then the spring 74 restores the arm 67 against its stop 79 disengaging the contacts 8—9.

By adjustably moving the weight 70 toward or from the shaft axis as above described, or by adjustably changing the mass thereof, the inertia may be varied and thus the time duration of contact engagement and the corresponding duration of the current impulse therethrough may be varied adjustably. Similarly, the duration of the impulse may be varied by adjusting the spring 74 which absorbs a part of the inertia and accelerates the weight 70 in the restoring direction.

Again, the duration of the impulse may be varied by adjustably changing the position of the cam 62 by adjustment of the shims 95, more shims causing the cam to engage the roller for a longer period and thus giving greater acceleration to the mass 70 and vice versa.

By this means as will now be clear, the contacts are engaged for a predetermined time interval and a current impulse of predetermined duration flows over the electric circuit above described through the electrodes 15 and 16 to effect a weld at the work. So long as the gun operator holds the button 34 in its depressed position, the cam 62 will remain in its upper position and the contacts having delivered a single impulse will remain open due to the fact that air pressure is maintained in the cylinder 41.

Having completed a weld, the operator will now release the button 34 and the valve 28 will move back to its normal position, shutting off pressure from the source and exhausting pressure from the gun, and from the conduit 39 through the duct 35 and out by the outlet 36. Thereupon the spring 57 will restore downwardly the piston rod 44 and the cam 62 and the cam will then ride over the roller follower 81, rocking the pawl 82 out of its path as illustrated in Fig. 5. When the cam has passed the roller, the roller will be returned to its normal position by the spring 84.

As described hereinbefore, if the operator holds the button 34 in operative position after the piston rod 44 has reached the top of its stroke and the pressure on opposite sides of the valve 50 becomes equalized, the valve 50 will return downwardly and reduce pressure under the piston by leakage through the ports 53—53, so that when subsequently the valve is released, the piston will return downwardly substantially without retardation due to air pressure thereunder.

It is one of the particular advantages of my invention that the contacts 8 and 9 will close to supply the current impulse always after the electrodes 15 and 19 have pressure-engaged the work which results from supplying the air pressure to the switch-operating cylinder 41 through a conduit 39 of substantial length whereas the cylinder 25 of the gun is supplied by pressure directly. A period of time must elapse while the pressure in the conduit 39 and cylinder 41 builds up to a value sufficient to compress the spring 57 and overcome the weight of the plunger 65 and associated parts operate the switch. This time delay may be effected by the resistance to air flow through the conduit 39 and by the volumetric capacity thereof which must be satisfied before the pressure will rise to the switch-operating value and a length of conduit and diameter of conduit 39 may be provided that will effect a sufficient delay in building up of pressure therein as described.

Switches of usual construction such as that shown in Fig. 2 generally mount the moving contact 8 on a supplemental arm 90 rendered yieldable by a spring 91 whereby the engagement of the contacts 8 and 9 is cushioned. The spring 91 naturally exerts a resilient force tending to close the switch-closing force and thus is a part of the load which the inertia above referred to must overcome and thus may be considered as a part of the force exerted by the spring 74 during the period of actual engagement of the contacts 8 and 9, but when once determined is constant and is accounted for when the inertia-producing elements above described are adjusted.

In the foregoing, I have illustrated and described an apparatus utilizing compressed air to operate the welding gun and to operate the electric contactor. In some aspects my invention is in no sense limited to compressed air as the fluid for operating the apparatus. Obviously, other gases than air under pressure can be employed, in which case the fluid pressure source connected to the conduit 37, Fig. 1, would be any compressed gas source instead of the "compressed air source" illustrated. Furthermore, my invention may be practiced with fluid of liquid form. In such case it may be desirable to provide conduit means to conduct away from the gun and away from the cylinder 41 the liquid discharged therefrom in the operation of the apparatus, and such an arrangement is shown in Fig. 8. The construction of the apparatus in this figure will be seen to be the same as that in the other figures except that the source of compressed air is replaced by a source of liquid under pressure indicated at 100; the exhaust ports 53—53 discharge into an annular conduit 101 with which communicates a discharge conduit 102 through which liquid discharged through the ports 53—53 may be conducted away; and the outlet duct 36 of the gun communicates with a discharge conduit 103 by which the liquid discharged in the operation of the gun may be carried away.

It will be apparent, therefore, that my invention may be practiced with gas or liquid fluid and it is intended that the word "fluid" and derivatives thereof in the appended claims are to be interpreted with this meaning.

My invention is not limited to the exact details of construction shown and described. Changes and modifications may be made within the spirit of my invention and without sacrificing its advantages and within the scope of the appended claims.

This application is divisional from my application Serial No. 22,407, filed May 20, 1935, for improvements in Time controlled electric switches, which has issued into Patent Number 2,047,573, July 14, 1936.

I claim:

1. In a timing electric switch construction for controlling the duration of an electric current impulse for welding et cetera, an electric switch, a mechanism comprising a reciprocable element for operating the switch for a time interval and then effecting restoring of it upon movement of the reciprocable element in one direction, and the mechanism being ineffective to operate the switch upon restoring movement of the reciprocable element, reciprocable fluid pressure operable means to reciprocate the reciprocable element in said direction and means for restoring the reciprocable element and fluid operable means.

2. In a timing electric switch construction for controlling the duration of an electric current impulse for welding et cetera, a switch, a mechanism comprising a reciprocable element for operating the switch for a time interval and then restoring it upon movement of the reciprocable element in one direction, the mechanism being ineffective to operate the switch upon restoring movement of the reciprocable element, reciprocable fluid pressure operable means comprising a piston and cylinder operable to operate the reciprocable element in said direction, and resilient means for restoring the reciprocable element and fluid operable means.

3. An electric timing switch comprising a pivotally supported switch arm, a weight connected to the arm, a cam element and a follower element, one being reciprocably movable to cammingly move the other, mechanism means communicating movement of the moved element to the switch arm, the cam and follower elements being formed to effect switch-operating and restoring movements of the arm during reciprocatory movement in one direction and to be ineffective to move the arm by reciprocatory element in the other direction, means to reciprocate the movable element to cause the switch to be operated for a predetermined interval and then restored, means for adjustably varying the effectiveness of the inertia of the weight and means to adjust the relative positions of the cam and follower whereby the time period during which the switch is in operated position may be adjustably varied.

4. In a switch construction, a main base supporting a switch contact, a shaft rotatably mounted on the base and supporting a switch arm carrying a contact, an operating arm secured to the shaft, a weight on the arm, a follower on the arm, a cylinder supported on the base, a piston reciprocable in the cylinder, a cam connected to the piston and disposed to engage the follower to move it in one direction of reciprocation and to idle over it in the other direction, an adjustment shim for adjustably positioning the cam relative to the follower, means for introducing compressed gas from a suitable source into the cylinder to reciprocate it in one direction, resilient means to reciprocably return it upon interruption of gas supplied to the cylinder, and an automatic valve to effect quick discharge of gas from the cylinder upon return reciprocation thereof.

5. An electric timing switch comprising a pivotally supported arm, a weight connected to the arm, mechanism means comprising a reciprocably movable element arranged to communicate its movement to the switch arm to effect switch operating and restoring movements of the arm during reciprocatory movement in one direction and to be ineffective to move the arm in the other reciprocatory direction, means to reciprocate the said element to cause the switch to be operated for a predetermined interval and then restored, means for adjustably varying the effectiveness of the inertia of the weight to adjustably vary the time period during which the switch is in operated position.

6. In a switch construction, a main base supporting a switch contact, a shaft rotatably mounted on the base and supporting a switch arm carrying a contact, an operating arm secured to the shaft, a weight on the arm, a cylinder supported on the base, a piston reciprocable in the cylinder, means for introducing compressed gas from a suitable gas supply source into the cylinder to reciprocate the piston in one direction, resilient means to reciprocably return it upon interruption of gas supply to the cylinder, and mechanism operable by movement of the piston in said one direction to turn the shaft to engage the contacts and then to disengage them after a predetermined time interval, resilient means to reciprocably return the piston and means to adjust the inertia effect of the weight on the arm to adjustably vary the time interval.

7. In a switch construction, a main base supporting a switch contact, a shaft rotatably mounted on the base and supporting a switch arm carrying a contact, an operating arm secured to the shaft, a weight on the arm, a cylinder supported on the base, a piston reciprocable in the cylinder, means for introducing compressed gas from a suitable supply source into the cylinder to reciprocate the piston in one direction, resilient means to reciprocably return it upon interruption of gas supply to the cylinder, and mechanism operable by movement of the piston in said one direction to turn the shaft to engage the contacts and then to disengage them after a predetermined time interval, resilient means to reciprocably return the piston and an automatic valve to effect quick discharge of gas from the cylinder upon return reciprocation of the piston.

8. In a timed electric switch construction for controlling the duration of an electric current impulse for welding et cetera, and electric switch, a reciprocable cam mechanism for operating the switch for a time interval and then restoring it upon movement of the cam mechanism in one direction, the cam mechanism being ineffective to operate the switch upon restoring movement of the cam mechanism, reciprocable fluid operable means to cushioningly operate the cam mechanism in said direction and means for restoring the cam mechanism and fluid operable means.

9. In a timed electric switch construction for controlling the duration of an electric current impulse for welding et cetera, a switch, a reciprocable cam mechanism for operating the switch for a time interval and then restoring it upon movement of the cam mechanism in one direction, the cam mechanism being ineffective to operate the switch upon restoring movement of the cam mechanism, reciprocable fluid operable means comprising a piston and cylinder operable to cushioningly operate the cam mechanism in said direction, and resilient means for restoring the cam mechanism and fluid operable means.

10. In an electric switch construction, a switch, means comprising a reciprocable element, cam mechanism effective in one direction of reciprocation only to operate the switch for a predetermined period and then restore the switch, the cam mechanism comprising a cam element having a camming surface and means to adjustably position the caming element to adjustably change the said predetermined time period.

11. In an electric switch construction, a switch, pneumatic means comprising a reciprocable element, cam mechanism effective in one direction of reciprocation only to operate the switch for a predetermined time period and then restore the switch, the cam mechanism comprising a cam element having a camming surface and shim means to adjustably position the cam element to adjustably change the said predetermined time period.

12. In an electric switch mechanism, a switch comprising a movable switch element, a movable mechanism element having a normal position, a source of fluid pressure, fluid pressure operable means comprising an expansible and contractable fluid pressure chamber having a pressure movable wall, means to communicate fluid pressure from the source to the chamber, means to communicate movement of the movable wall to the mechanism element to move it from its normal position upon application of pressure of the source to the chamber, mechanism means effective during movement of the mechanism element from its normal position to both operate the switch for a predetermined period of time and then restore it, resilient restoring means opposing movement of the mechanism element to prevent the chamber wall from effecting movement of the movable element except at fluid pressure in the chamber above a predetermined value, the restoring means being effective to restore the movable element upon dis-continuing application of source pressure to the chamber.

13. The switch mechanism described in claim 12 and in which means is provided to reduce the pressure in the chamber after movement of the mechanism element to cause the restoring of the mechanism element to occur rapidly.

14. The mechanism described in claim 12 and in which the fluid pressure operable mechanism comprises a cam member and a cam follower member, one member being movable with the switch element and the other member being movable with the said movable element and engageable with the said one member to move it during movement of the movable element from its normal position.

15. In an electric switch mechanism, a switch comprising a movable switch operable element arranged to have predetermined mass, a movable element movable from a normal position and returnable there to, actuating means for moving the movable element comprising, a cam member and a cam follower member, one supported by the switch element and the other by the movable element and mutually cammingly engageable and disengageable upon movement of the movable element from its normal position to effect a switch operating movement of the switch operating element, means yieldingly opposing movement of the switch operating element and stopping and restoring it after an interval of time predetermined by the mass of the switch operating element, and one said member being movably supported and yieldably movable out of the path of the other upon return movement of the movable element to its normal position to prevent camming engagement of the members.

16. In an electric switch mechanism for timing an electric current, a stationary contact, a movable switch operating element carrying a movable contact and biased to a normal contact disengaged position and having predetermined mass, a reciprocable element having a normal position, means to effect reciprocation of the reciprocable element from and back to its normal position, a cam follower member and a cam member one carried by the switch element and the other by the reciprocable element adapted to be successively cammingly engaged and disengaged upon reciprocation of the reciprocable element in one direction to effect successive engagement and disengagement of the contacts, mechanism to effect movement of the movable switch operating element from its biased position, yieldable means opposing movement of the switch operating element and stopping said movement and returning the switch operating element to its biased position after a predetermined time interval determined by the mass of the switch operating element.

17. The mechanism described in claim 15 and in which means is provided to change the inertia effect of said mass to adjustably vary the time during which the switch remains operated.

18. The mechanism described in claim 16 and in which means is provided to adjust the length of the time during which the contacts remain engaged comprising means to adjustably vary the inertia effect of said mass.

19. In an electric current timing switch mechanism a switch, a movable switch operating member having predetermined mass, a reciprocally supported reciprocable element, a pneumatically operated mechanism to reciprocate it, mechanism to transmit reciprocatory movement of the reciprocable element in one direction of reciprocation to the switch operating member to move it to close the switch and then to permit it to return to open the switch, yieldable means to open the switch and opening it after a predetermined time interval determined by the predetermined mass of the switch operating member.

20. In an electric current timing switch mechanism, a main base, a shaft oscillatingly supported on the base, a switch arm carrying a contact connected to and oscillatable with the shaft, a contact on the base engageable by the arm carried contact, an operating arm connected to the shaft, a reciprocable element reciprocably supported on the base, a cam and cam follower, one carried by the operating arm and one carried by the reciprocable element and mutually engageable upon reciprocatory movement of the reciprocable element in one direction to move the operating arm to oscillate the shaft and close the contacts, and subsequently disengageable to permit the operating arm and switch arm to be restored, yieldable means constantly urging the said arm toward restored position, the cam and cam follower upon return reciprocation of the reciprocable element being ineffective to oscillate the shaft, a pneumatic cylinder supported on the base, a piston in the cylinder connected to the reciprocatory element to reciprocate it in said one direction upon communication of fluid pressure to the cylinder, and yieldable means constantly urging the reciprocable element in the said return direction, and returning it upon interruption of the fluid pressure communication.

21. In an electric timing switch mechanism, an electric switch comprising an oscillatable switch operating element having a normal switch restored position and having predetermined inertia provided by weight means having a center of mass spaced from the oscillation axis of the operating element, a reciprocatory actuating element biased to a normal position, means to reciprocatively move the actuating element from its normal position, mechanism means on the actuating element and on the switch operating element mutually engaged upon said reciprocative movement of the actuating element to give an impulse of force to the switch operating element to cause it to oscillatingly move to effect operation of the switch, yielding means tending to overcome the inertia of the switch operating element and to restore it and the switch, and doing so after a predetermined interval of time determined by the inertia of the switch operating element during which period of time the switch remains operated, and means to adjustably vary the time interval comprising means to adjustably vary the distance of the said center of mass from the axis of oscillation to adjustably vary the inertia effect of the switch operating element.

22. In an electric timing switch mechanism an electric switch comprising a movably supported operating switch element having a normal switch restored position and arranged to have predetermined mass, pneumatically operated actuating means to give the switch operating element an impulse of force to oscillate it in one direction to effect an operation of the switch, means yieldingly opposing the said movement of the switch operating element and effective to overcome it to restore the switch operating element to its normal position and to thereby restore the switch after a predetermined interval of time determined by the inertia of said mass.

23. The mechanism described in claim 22, and in which means is provided to adjust the time interval comprising means to adjustably vary the inertia effect of the said mass.

24. The mechanism described in claim 22, and in which a part of the mass is in a weight disposed at a predetermined distance from the axis of oscillation and means is provided to adjustably vary the distance to adjustably vary the time interval.

25. In a timing electric switch construction for controlling the duration of an electric current impulse for welding et cetera, an electric switch comprising a switch operating element, a mechanism comprising a reciprocable element, a cam and a cam follower one associated with the switch operating element and the other with the reciprocable element, the reciprocable element upon reciprocation in one direction causing the cam follower and cam to engage and effect operation of the switch and then to disengage and effect restoring of the switch, reciprocable fluid pressure operable means to reciprocate the reciprocable element in said one direction and means for restoring the reciprocable element and fluid pressure operable means.

26. In an electric switch mechanism, a switch, a movable element having a normal position, a source of fluid pressure, fluid pressure operable means comprising an expansible and contractable fluid pressure chamber having a pressure movable wall, means to communicate fluid pressure from the source to the chamber, means to communicate movement of the movable wall to the movable element to move it from its normal position upon application of pressure of the source to the chamber, means effective during movement of the movable element from its normal position to effect an operation of the switch for a predetermined period of time and then to effect restoring of it, restoring means opposing movement of the mechanism element to prevent the chamber wall from effecting movement of the movable element except at fluid pressure in the chamber above a predetermined value, the restoring means being effective to restore the movable element upon discontinuing application of source pressure to the chamber.

27. In a timing electric switch construction for controlling the duration of an electric current impulse for welding et cetera, an electric switch, a mechanism comprising a normally restored reciprocable element for operating the switch for a time interval and then effecting restoring of it upon movement of the reciprocable element in one direction, and the mechanism being ineffective to operate the switch upon restoring reciprocatory movement of the reciprocable element, normally restored reciprocable fluid pressure operable means to reciprocate the reciprocable element in said direction upon communication of fluid pressure thereto, and the reciprocable element and fluid pressure operable means being arranged to return to normal positions upon interruption of the fluid pressure communication.

28. In a timing electric switch construction for controlling the duration of an electric current impulse for welding et cetera, an electric switch comprising a switch operating element, a mechanism comprising a normally restored reciprocable element, a cam and a cam follower one associated with the switch operating element and the other with the reciprocable element, the reciprocable element upon reciprocation in one direction causing the cam follower and cam to engage and effect operation of the switch and then to disengage and effect restoring of the switch, normally restored reciprocable fluid pressure operable means responsive to fluid pressure communicated thereto to reciprocate the reciprocable element in said one direction and the reciprocable element and fluid pressure operable means being arranged to return to restored positions upon interruption of the fluid pressure communication.

EDWARD G. BEIDERMAN.